United States Patent
Wenzel

(10) Patent No.: US 9,115,752 B2
(45) Date of Patent: Aug. 25, 2015

(54) BEARING ASSEMBLY

(76) Inventor: Kenneth H. Wenzel, Edmonton (CA)

( * ) Notice: Subject to any disclaimer, the term of this patent is extended or adjusted under 35 U.S.C. 154(b) by 0 days.

(21) Appl. No.: 13/537,984

(22) Filed: Jun. 29, 2012

(65) Prior Publication Data

US 2013/0004105 A1 Jan. 3, 2013

(51) Int. Cl.
| F16C 37/00 | (2006.01) |
| F16C 23/04 | (2006.01) |
| E21B 4/00 | (2006.01) |
| F16C 17/10 | (2006.01) |
| F16C 33/04 | (2006.01) |

(52) U.S. Cl.
CPC ............ *F16C 23/04* (2013.01); *E21B 4/003* (2013.01); *F16C 17/10* (2013.01); *F16C 33/043* (2013.01); *F16C 37/002* (2013.01); *F16C 2206/04* (2013.01); *F16C 2352/00* (2013.01)

(58) Field of Classification Search
CPC ....... E21B 10/22; E21B 10/24; E21B 10/246; E21B 4/003; F16C 33/26; F16C 33/12; F16C 33/24; F16C 17/14; F16C 37/00; F16C 37/002
USPC ......... 384/95, 97, 92, 93, 321, 282, 286, 175, 384/303, 425, 194, 245, 420; 175/107, 215, 175/320
IPC .......................................................... E21B 4/02
See application file for complete search history.

(56) References Cited

U.S. PATENT DOCUMENTS

| 3,456,746 A | * | 7/1969 | Tschirky et al. ............... 175/320 |
| 3,934,956 A |  | 1/1976 | Pitner |
| 3,982,859 A | * | 9/1976 | Tschirky et al. .................. 418/48 |
| 4,410,054 A | * | 10/1983 | Nagel et al. .................... 175/107 |
| 4,560,014 A |  | 12/1985 | Geczy |
| 5,037,212 A |  | 8/1991 | Justman et al. |
| 5,248,204 A |  | 9/1993 | Livingston et al. |
| 5,364,192 A |  | 11/1994 | Damm et al. |
| 5,368,398 A |  | 11/1994 | Damm et al. |
| 6,016,288 A |  | 1/2000 | Frith |
| 6,109,790 A |  | 8/2000 | von Gynz-Rekowski et al. |
| 6,361,217 B1 |  | 3/2002 | Beasley |
| 6,416,225 B1 |  | 7/2002 | Cioceanu et al. |
| 6,655,845 B1 |  | 12/2003 | Pope et al. |
| 6,827,160 B2 |  | 12/2004 | Blair et al. |
| 7,028,777 B2 |  | 4/2006 | Wade et al. |
| 7,040,394 B2 |  | 5/2006 | Bailey et al. |
| 7,306,059 B2 |  | 12/2007 | Ide |
| 7,500,787 B2 |  | 3/2009 | Cioceanu |

(Continued)

*Primary Examiner* — Richard W Ridley
*Assistant Examiner* — Yamilka Pinero Medina
(74) *Attorney, Agent, or Firm* — Davis & Bujold, P.L.L.C.; Michael J. Bujold

(57) ABSTRACT

A bearing assembly includes a tubular outer housing and a tubular inner mandrel. The outer housing has an exterior surface and an interior surface defining an interior bore. The inner mandrel has an exterior surface and an interior surface defining an interior mud flow channel. The inner mandrel is journaled for rotation within the interior bore of the outer housing. Pairs of diamond bearings having opposed curved bearing surfaces are disposed between the outer housing and the inner mandrel. One of each pair of opposed curved bearing surfaces being convex and being secured to one of the inner mandrel or outer housing and another of each pair of opposed curved bearing surfaces being concave and secured to another of the inner mandrel or outer housing. The opposed curved bearing surfaces accommodate limited relative misalignment and provide radial and axial support between the inner mandrel and the outer housing.

10 Claims, 3 Drawing Sheets

(56) References Cited

U.S. PATENT DOCUMENTS

| | | |
|---|---|---|
| 7,635,034 B2 | 12/2009 | Williams |
| 8,215,841 B2 | 7/2012 | Wenzel |
| 8,312,631 B2 * | 11/2012 | Sexton ................. 29/898.07 |
| 8,480,304 B1 * | 7/2013 | Cooley et al. ............... 384/95 |
| 2003/0015352 A1 * | 1/2003 | Robin ..................... 175/107 |
| 2003/0094310 A1 * | 5/2003 | Eppink et al. ............... 175/61 |
| 2005/0241833 A1 | 11/2005 | Bailey et al. |
| 2006/0108119 A1 | 5/2006 | Bailey et al. |
| 2007/0071373 A1 | 3/2007 | Wenzel |
| 2008/0059073 A1 | 3/2008 | Giroux et al. |

* cited by examiner

BEARING ASSEMBLY

FIELD

There is described a bearing assembly for use in earth drilling with a down hole motor.

BACKGROUND

Deflection of the mandrel or drive shaft of a drilling motor bearing assembly during directional drilling operations is caused by high radial loads, which adversely effect the operation of the bearing assembly. What is required is a bearing assembly that can better withstand the high radial loads resulting in deflection.

SUMMARY

There is provided a bearing assembly, which includes a tubular outer housing and a tubular inner mandrel. The outer housing has an exterior surface and an interior surface defining an interior bore. The inner mandrel has an exterior surface and an interior surface defining an interior mud flow channel. The inner mandrel is journaled for rotation within the interior bore of the outer housing. Pairs of diamond bearings having opposed curved bearing surfaces are disposed between the outer housing and the inner mandrel. One of each pair of opposed curved bearing surfaces being convex and being secured to one of the inner mandrel or outer housing and another of each pair of opposed curved bearing surfaces being concave and secured to another of the inner mandrel or outer housing. The opposed curved bearing surfaces accommodate limited relative misalignment and provide radial and axial support between the inner mandrel and the outer housing. A flow path for drilling fluid to cool the diamond bearings is provided between the opposed curved bearing surfaces.

The bearing assembly, as described above, uses opposed diamond bearing surfaces which are able to withstand considerable loading. The opposed bearing surfaces are curved and, as such, are able to accommodate limited deflection of the inner mandrel, while maintaining the diamond bearings in contact. It is preferred that the opposed curved bearing surfaces have a radius of curvature from a focal point positioned on a longitudinal axis of the inner mandrel. This creates a symmetry which best accommodates relative movement of the outer housing and the inner mandrel due to deflection.

In the illustrated embodiment, the inner mandrel has a first end and a second end. A first grouping of pairs of diamond bearings are positioned at the first end of the inner mandrel and a second grouping of pairs of diamond bearings are positioned at the second end of the inner mandrel. Diamond bearings require constant cooling in order to function properly. An issue that had to be addressed was how to deliver cooling drilling fluid to both the first grouping and the second grouping. This was addressed in the illustrated embodiment by providing the flow path with an inlet directing drilling fluids to pass between the opposed curved bearing surfaces of the first grouping of pairs of diamond bearings at the first end of the inner mandrel and an outlet for drilling fluids to pass between the opposed curved bearing surfaces of the second grouping of pairs of diamond bearings at the second end of the inner mandrel.

In order to allow communication between the first grouping and the second grouping flow path extending between the exterior surface of the inner mandrel and the interior surface of the outer housing was used for drilling fluids to pass from the inlet to the outlet. An issue that had to be addressed was the washing or eroding action the flow of drilling fluids had on the metal. This was addressed by positioning a flow restrictor in the flow path to restrict the flow of drilling fluids passing from the inlet to the outlet. In the illustrated embodiment, the flow restrictor, which is made from a hard, erosion resistant material, consists of an inner sleeve on the exterior surface of the inner mandrel and an outer sleeve on the interior surface of the outer housing. The drilling fluids pass through an annular restriction between the inner sleeve and the outer sleeve.

A threaded connection at a first or uppermost end of the inner mandrel is a potential failure point in a bearing assembly. In the prior art, a failure at the first or uppermost end of the inner mandrel has resulted in the inner mandrel separating from the outer housing and being lost down hole. In order to address this issue, a projection is provided on the exterior surface of the inner mandrel and an engagement surface on the interior surface of the outer housing should the threaded connection at the upper end of the inner mandrel fail or break. The engagement surface engages the projection to prevent separation of the inner mandrel and the outer housing. There will hereinafter be described one configuration for accomplishing this in which the projection is tapered and the engagement surface is a tapered split ring resting on a shoulder formed on the interior surface of the outer housing. It is preferred that both the projection and the engagement surface be tapered, as gradual changes in inner mandrel diameter which allow for larger radii, help to reduce stress risers. However, it will be understood that one or both may not be tapered.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
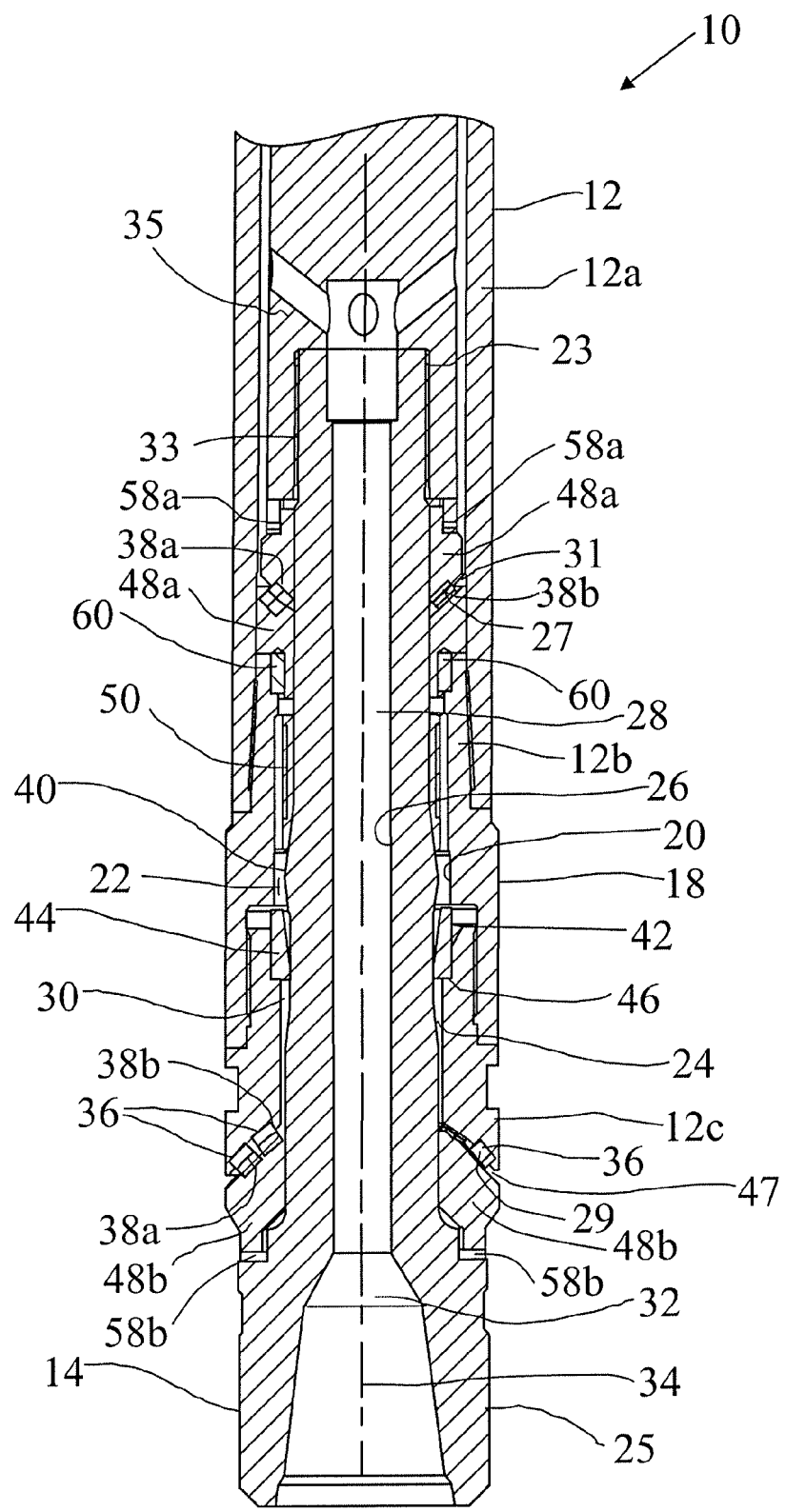
FIG. 1 is a side elevation view, in section, of a bearing assembly.

A bearing assembly generally identified by reference numeral 10, will now be described with reference to FIG. 1 through 3.

Structure and Relationship of Parts:

Referring to FIG. 1, a bearing assembly 10 includes a tubular outer housing 12 that has an exterior surface 18 and an interior surface 20 that defines an interior bore 22. For assembly, tubular outer housing 12 is fabricated in several sections 12a, 12b, and 12c which are secured together by threaded connections. Section 12c can be characterized as serving the function of a lower housing bearing carrier. A tubular inner mandrel 14 is journaled for rotation within interior bore 22 of outer housing 12. Tubular inner mandrel 14 has an exterior surface 24 and an interior surface 26 that defines an interior mud flow channel 28. Referring to FIG. 2, two pairs of diamond bearings 36 are shown, each with opposed curved bearing surfaces 38a and 38b and disposed between outer housing 12 and inner mandrel 14. Referring to FIG. 1, opposed curved bearing surfaces 38a and 38b have a radius of curvature from a focal point 32 positioned on a longitudinal axis 34 of inner mandrel 14. One of each pair of opposed curved bearing surfaces 38a is convex and is secured to either inner mandrel 14 or outer housing 12, while the other of the opposed curved bearing surface 38b is concave. In the depicted example in FIG. 1, a convex bearing surface 38a and a concave bearing surface 38b is mounted to each of upper mandrel bearing carrier 48a and lower mandrel bearing carrier 48b. Convex bearing surfaces 38a of upper mandrel bearing carrier 48a and lower mandrel bearing carrier 48b are locked to inner mandrel 14 by upper clutch engagement 58a and lower clutch engagement 58b, respectively, so that upper mandrel bearing carrier 48a and lower mandrel bearing carrier 48b rotate with mandrel 14. It will be understood that other engagements could be used. For example, the components could be threaded together. Concave bearing surfaces 38b are mounted on section 12c, which serves as lower housing bearing carrier 48b and upper housing bearing carrier 48a. Section 12c is locked by a drive key 60 to outer housing 12. Each pair of diamond bearings 36 is, therefore, attached to both inner mandrel 14 and outer housing 12, with one of opposed curved bearing surfaces 38a being secured to inner mandrel 14 and the other curved bearing surface 38b being secured to outer housing 12. Opposed curved bearing surfaces 38a and 38b accommodate limited relative misalignment and provide radial and axial support between inner mandrel 14 and outer housing 12. Convex bearing surface 38a and concave bearing surface 38b are maintained in contact by imposing a preload through the use of shims in the area of upper clutch engagement 58a.

Referring to FIG. 1, inner mandrel 14 has a first end 23 and a second end 25. A first grouping 27 of pairs of diamond bearings 36 are positioned at first end 23 of inner mandrel 14 and a second grouping 29 of pairs of diamond bearings 36 are positioned at second end 25 of inner mandrel 14. A threaded connection 33 at first end 23 of inner mandrel 14 is used for connecting to a motor adaptor 35 of a downhole motor.

Referring to FIG. 1, a flow path 30 is provided for drilling fluid to cool diamond bearings 36 between opposed curved bearing surfaces 38a and 38b. Flow path 30 has an inlet 31 that directs drilling fluids to pass between opposed curved bearing surfaces 38a and 38b of first grouping 27 of pairs of diamond bearings 36 at first end 23 of inner mandrel 14 and an outlet 47 for drilling fluids to pass between opposed curved bearing surfaces 38a and 38b of second grouping 29 of pairs of diamond bearings 36 at second end 25 of inner mandrel 14. Flow path 30 extends between exterior surface 24 of inner mandrel 14 and interior surface 20 of outer housing 12. Drilling fluids pass along flow path 30 to get to outlet 47 from inlet 31.

Referring to FIG. 1, a flow restrictor 50 may be positioned in flow path 30 to restrict flow of drilling fluids passing from inlet 31 to outlet 47. Referring to FIG. 3, flow restrictor 50 has an inner sleeve 52 on exterior surface 24 of inner mandrel 14 and an outer sleeve 54 on interior surface 20 of outer housing 12. Drilling fluids pass through an annular restriction 56 created between inner sleeve 52 and outer sleeve 54.

Referring to FIG. 1, a projection 40 is positioned on exterior surface 24 of inner mandrel 14 and an engagement surface 42 is provided on interior surface 20 of outer housing 12. Engagement surface 42 engages projection 40 to prevent separation of inner mandrel 14 and outer housing 12. In the illustrated embodiment, projection 40 is tapered. In the illustrated embodiment, in order to facilitate fabrication and assembly, engagement surface 42 is a tapered split ring 44, which rest on a shoulder 46 formed on interior surface 20 of outer housing 12. It will be understood that projection 40 does not have to be tapered and engagement surface 42 may be different from what is shown.

Operation:

Referring to FIG. 1, inner mandrel 14 is connected to motor adaptor 35 by threaded connection 33 at first end 23 of inner mandrel 14. Motor adaptor 35 imparts a rotational force to inner mandrel 14. Drilling fluids from surface are pumped down interior mud flow channel 28 of inner mandrel 14 to a drill bit (not shown) and carry cuttings to surface. Diamond bearings 36 positioned at first end 23 of inner mandrel 14 in first grouping 27 and at second end 25 of inner mandrel 14 in second grouping 29 provide radial and axial support between inner mandrel 14 and outer housing 12.

Figure 2:
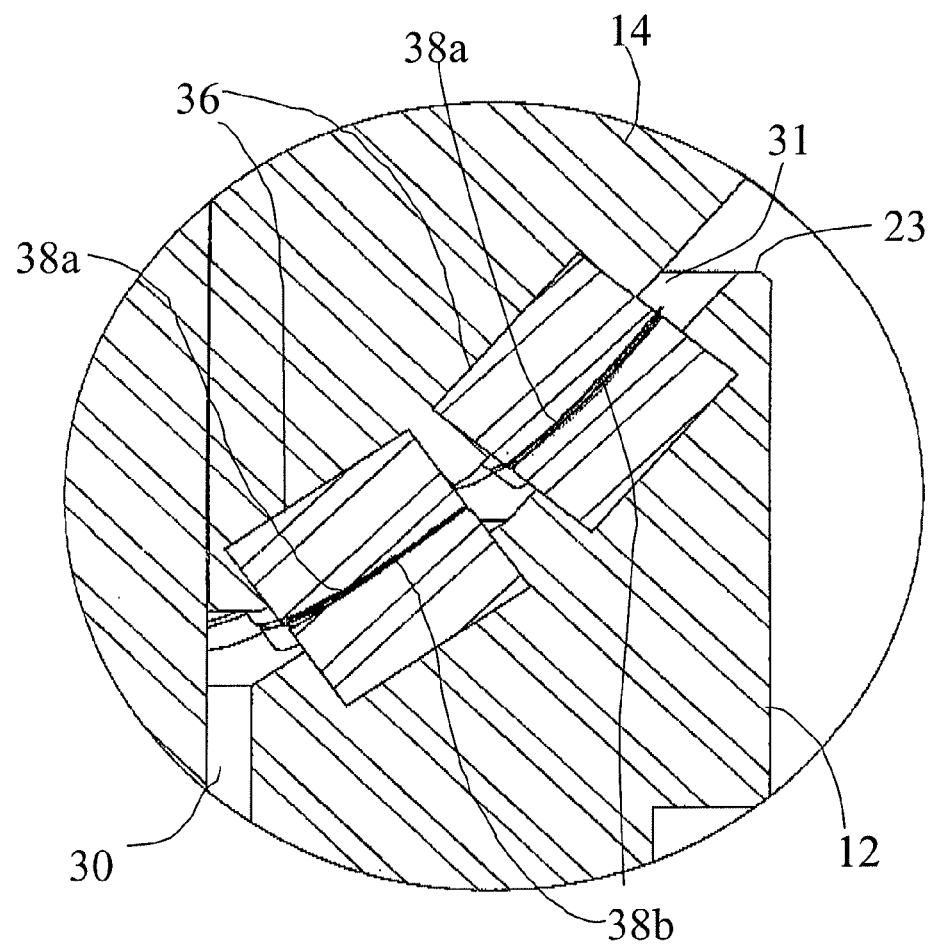
FIG. 2 is a detailed side elevation view, in section, of the curved bearing surface of the bearing assembly shown if FIG. 1.

Referring to FIG. 2, should deflection of inner mandrel 14 occur, opposed curved bearing surfaces 38a and 38b maintain contact to accommodate limited relative misalignment.

Referring to FIG. 1, diamonds must be cooled to continue functioning and flow path 30 provides drilling fluid to cool diamond bearings 36. Drilling fluid enters flow path 30 at inlet 31 and passes between opposed bearing surfaces 38a and 38b of first grouping 27 of pairs of diamond bearings 36 at first end 23 of inner mandrel 14 and then passes between second grouping 29 of diamond bearings 36 before exiting flow path 30 at outlet 47.

Figure 3:
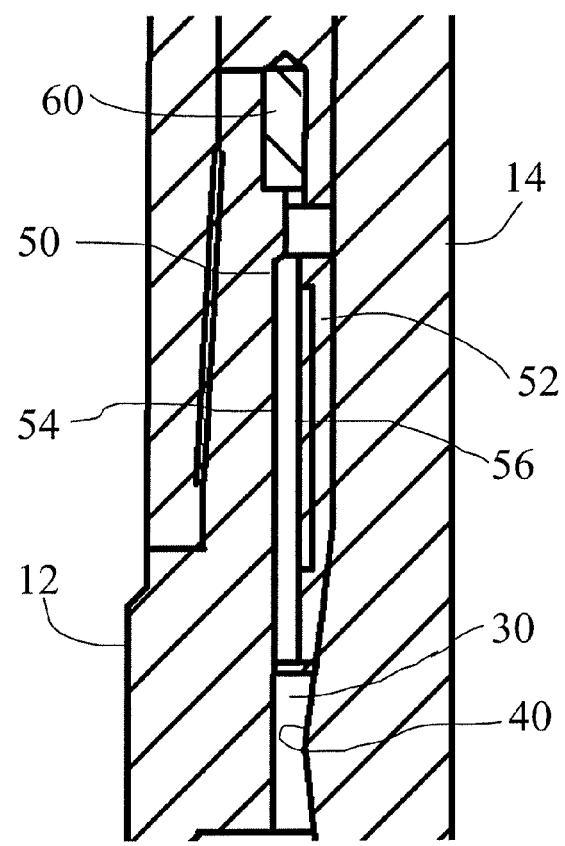
FIG. 3 is a detailed side elevation view, in section, of a flow restrictor utilized with the bearing assembly shown in FIG. 1.

Referring to FIG. 3, a continual flow of drilling fluid can cause washing of metal components. It is, therefore, preferred that a flow restrictor 50 be positioned along flow path 30 to restrict flow of drilling fluids passing from inlet 31 to outlet 47. Referring to FIG. 3, inner sleeve 52 and outer sleeve 54 of flow restrictor 50 form an annular restriction 56 through which drilling fluid must pass to reach outlet 47.

Referring to FIG. 1, should threaded connection 33 fail, projection 40 positioned exterior surface 24 of inner mandrel 14 and engagement surface 42 on tapered split ring 44 resting on shoulder 46 provided on interior surface 20 of outer housing 12 engage to prevent separation of inner mandrel 14 and outer housing 12.

The bearing assembly, as described, is able to handle deflection of inner mandrel 14, while still maintaining good bearing contact. It is able to do so in a relatively short length, providing a bearing assembly that is as short as or shorter than commercially available bearing assemblies.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with the description as a whole.

What is claimed is:

1. A bearing assembly, comprising
    a tubular outer housing having an exterior surface and an interior surface defining an interior bore;
    a tubular inner mandrel having an exterior surface and an interior surface defining an interior mud flow channel, the inner mandrel being journaled for rotation within the interior bore of the outer housing;
    a first row of pairs of diamond bearings and a second row of pairs of diamond bearings, each pair of diamond bearings in the first and second rows having opposed curved bearing surfaces disposed between the outer housing and the inner mandrel, one of each pair of opposed curved bearing surfaces being convex and being secured to a first angled surface on one of the inner mandrel or outer housing and another of each pair of opposed curved bearing surfaces being concave and secured to a second angled surface on another of the inner mandrel or outer housing and parallel to the first angled surface, the first and second angled surfaces being angled relative to a longitudinal axis of the tubular inner mandrel, the opposed curved bearing surfaces accommodating limited relative misalignment and providing radial and axial support between the inner mandrel and the outer housing;

the opposed curved bearing surfaces of each pair of diamond bearings having a common radius of curvature defined from a focal point positioned on the longitudinal axis of the inner mandrel, the second row being concentrically disposed within the first row along the radius of curvature and the first and the second angled surfaces being at an angle tangential to the radius of curvature; and a flow path for drilling fluid to cool the diamond bearings between the opposed curved bearing surfaces.

2. The bearing assembly of claim 1, wherein the inner mandrel has a first end and a second end, a first grouping of pairs of diamond bearings being positioned at the first end of the inner mandrel and a second grouping of pairs of diamond bearings positioned at the second end of the inner mandrel.

3. The bearing assembly of claim 2, wherein there is a threaded connection at the first end of the mandrel for connection to a motor adaptor of a downhole motor.

4. The bearing assembly of claim 2, wherein the flow path has an inlet directing drilling fluids to pass between the opposed curved bearing surfaces of the first grouping of pairs of diamond bearings at the first end of the inner mandrel and an outlet for drilling fluids to pass between the opposed curved bearing surfaces of the second grouping of pairs of diamond bearings at the second end of the inner mandrel.

5. The bearing assembly of claim 4, wherein the flow path extends between the exterior surface of the inner mandrel and the interior surface of the outer housing, drilling fluids passing along the flow path to get to the outlet from the inlet.

6. The bearing assembly of claim 5, wherein a flow restrictor is positioned in the flow path to restrict the flow of drilling fluids passing from the inlet to the outlet.

7. The bearing assembly of claim 6, wherein the flow restrictor is comprised of an inner sleeve on the exterior surface of the inner mandrel and an outer sleeve on the interior surface of the outer housing, such that drilling fluids pass through an annular restriction between the inner sleeve and the outer sleeve.

8. The bearing assembly of claim 1, wherein there is a projection on the exterior surface of the inner mandrel, and an engagement surface on the interior surface of the outer housing, the engagement surface engaging the projection to prevent separation of the inner mandrel and the outer housing.

9. The bearing assembly of claim 8, wherein the projection is tapered and the engagement surface is a tapered split ring resting on a shoulder formed on the interior surface of the outer housing.

10. A bearing assembly comprising a tubular outer housing having an exterior surface and an interior surface defining an interior bore;

a tubular inner mandrel having an exterior surface and an interior surface defining an interior mud flow channel, and the inner mandrel being journaled for rotation within the interior bore of the outer housing;

a first row of pairs of diamond bearings and a second row of pairs of diamond bearings, each pair of diamond bearings in the first and second rows having opposed curved bearing surfaces disposed between the outer housing and the inner mandrel, one of each pair of opposed curved bearing surfaces being convex and being secured to a first angled surface on one of the inner mandrel or outer housing and another of each pair of opposed curved bearing surfaces being concave and secured to a second angled surface on another of the inner mandrel or outer housing;

the opposed curved bearing surfaces of each pair of diamond bearings having a common radius of curvature defined from a focal point positioned on the longitudinal axis of the inner mandrel, the second row being concentrically disposed within the first row along the radius of curvature and the first and the second angled surfaces being at an angle tangential to the radius of curvature;

the second angled surface being parallel to the first angled surface, the first and the second angled surfaces each forming an angle with respect to a longitudinal axis of the tubular inner mandrel which is neither normal to nor parallel to the longitudinal axis of the tubular inner mandrel and is tangential to the radius of the curvature, the angle of the first and the second angled surfaces of the first row being different from the angle of the first and the second angled surfaces of the second row, the opposed curved bearing surfaces accommodating limited relative misalignment and providing radial and axial support between the inner mandrel and the outer housing; and a flow path for drilling fluid to cool the diamond bearings between the opposed curved bearing surfaces.

* * * * *